United States Patent
Porikli et al.

(10) Patent No.: US 8,935,308 B2
(45) Date of Patent: Jan. 13, 2015

(54) METHOD FOR RECOVERING LOW-RANK MATRICES AND SUBSPACES FROM DATA IN HIGH-DIMENSIONAL MATRICES

(75) Inventors: Fatih Porikli, Watertown, MA (US); Xianbiao Shu, Urbana, IL (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 427 days.

(21) Appl. No.: 13/355,335

(22) Filed: Jan. 20, 2012

(65) Prior Publication Data

US 2013/0191425 A1 Jul. 25, 2013

(51) Int. Cl.
*G06F 7/00* (2006.01)
(52) U.S. Cl.
USPC .......................................... 708/207
(58) Field of Classification Search
CPC ....... G06F 9/30021; G06F 7/544; G06F 7/22; G06F 7/026; G06F 9/3001
USPC ............................................................ 708/207
See application file for complete search history.

(56) References Cited

U.S. PATENT DOCUMENTS

| 7,388,999 B2 * | 6/2008 | Samadani ............... 382/275 |
| 2002/0039454 A1 * | 4/2002 | Hunter et al. ............. 382/276 |
| 2008/0275580 A1 * | 11/2008 | Andersen ................ 700/94 |

* cited by examiner

*Primary Examiner* — Tan V. Mai
(74) *Attorney, Agent, or Firm* — Dirk Brinkman; Gene Vinokur (57) ABSTRACT

A method recovers an uncorrupted low-rank matrix, noise in corrupted data and a subspace from the data in a form of a high-dimensional matrix. An objective function minimizes the noise to solve for the low-rank matrix and the subspace without estimating the rank of the low-rank matrix. The method uses group sparsity and the subspace is orthogonal. Random subsampling of the data can recover subspace bases and their coefficients from a much smaller matrix to improve performance. Convergence efficiency can also be improved by applying an augmented Lagrange multiplier, and an alternating stepwise coordinate descent. The Lagrange function is solved by an alternating direction method.

13 Claims, 7 Drawing Sheets

MERL COMPANY CONFIDENTIAL

Algorithm 1 Solving SRSL using inexact ADM and SCD

Input: $X \in \mathbb{R}^{m \times n}, k, \lambda.$
Output: $D, \alpha, E$ 1: $Y^0 = X/\|X\|_F; A^0 = X; D^0 = \text{zeros}(m, k);$
   $\alpha^0 = \text{rand}(k, n); \mu^0 > 0; \rho > 1; i = 0;$
2: while $E$ not converged do
3:   // Solve $E^{i+1} = \arg\min_{E} \mathcal{L}(E, A^i, Y^i, \mu^i)$
4:   $E^{i+1} = S_{\lambda/\mu}(X - A^i + Y^i/\mu)$
5:   // Update $A^{i+1}$
6:   $A^{i+1} = X - E^{i+1} + Y^i/\mu$
7:   // Solve $(D^{i+1}, \alpha^{i+1}) = \arg\min_{D, \alpha} \mathcal{L}(D, \alpha, A^{i+1}, \mu^i);$
8:   for $t = 1 \to k$ do
9:     $D_t^i = 0;$
10:    $R_t^{i+1} = A^{i+1} - D^{i+1}\alpha^i;$
11:    $D_t^{i+1} = R_t^{i+1}\alpha_t^{i^T};$
12:    if $\|D_t^{i+1}\|_2 > 0$ then
13:      if $t > 1$ then
14:        $D_t^{i+1} = D_t^{i+1} - \sum_{j=1}^{t-1} D_j^{i+1}(D_j^{i+1})^T D_t^{i+1};$
15:      end if

*Fig. 4A*

16: $\quad D_t^{i+1} = D_t^{i+1}/\|D_t^{i+1}\|_2$;
17: $\quad \alpha_t^{i+1} = \bar{S}_{1/\mu}(D_t^{i+1}{}^T R_t^{i+1})$;
18: $\quad$ else
19: $\quad\quad \alpha_t^{i+1} = 0$;
20: $\quad$ end if
21: end for
22: // Shrink the size of $\alpha_t^{i+1}$ and $D^{i+1}$
23: for $t = 1 \to k$ do
24: $\quad$ if $\|\alpha_t^{i+1}\|_2 == 0$ then
25: $\quad\quad$ Delete $\alpha_t^{i+1}$ and $D_t^{i+1}$; $k = k - 1$;
26: $\quad$ end if
27: end for
28: // Update $Y^{i+1}, \mu^{i+1}$
29: $Y^{i+1} = Y^i + \mu(X - D^{i+1}\alpha^{i+1} - E^{i+1})$;
30: $\mu^{i+1} = \rho\mu^i$; $i = i + 1$;
31: end while

METHOD FOR RECOVERING LOW-RANK MATRICES AND SUBSPACES FROM DATA IN HIGH-DIMENSIONAL MATRICES

FIELD OF THE INVENTION

This invention relates generally to determiner vision and machine learning, and more particularly to recovering low-rank matrices from high-dimensional data in high high-dimensional matrices, wherein the data can be corrupted.

BACKGROUND OF THE INVENTION

Low-Rank Representation of High-Dimensional Data

Recovering and using a low-rank representation of high-dimensional data are frequently used in computer vision, statistical learning, and neural networks.

Principal Component Analysis (PCA) is one method of determining an optimal low-rank representation of the high-dimensional data in a $l_2$-norm sense. However, PCA is susceptible to statistical outliers, which are ubiquitous in realistic image data, due to occlusion, illumination and noise.

Numerous methods are known for error resilient PCA, e.g., by RANdom SAmple Consensus RANSAC), influence function techniques, and $l_1$-norm minimization.

Using the $l_1$-norm techniques, the low-rank recovery can be classified into two groups:
(1) Nuclear Norm Minimization (NNM); and
(2) Matrix Factorization (MF).

Nuclear Norm Minimization

NNM uses a nuclear norm as a surrogate for a highly non-convex rank minimization, such as Robust PCA (RPCA), and a Sparse and Low-Rank Matrix Decomposition (SLRMD). RPCA and SLRMD share the same idea. RPCA is a convex problem with a performance guarantee. RPCA assumes acquired data are in a form of an observation matrix X. The matrix $X \in \Re^{m \times n}$ has two additive components:
(1) a low-rank matrix A (rank: $r \ll \min\{m,n\}$); and
(2) a sparse matrix E.

By minimizing the nuclear norm of A and the $l_1$-norm of E, RPCA can recover a low-rank matrix from corrupted data as follows:

$$\min_{A,E} \lambda \|A\|_* + \|E\|_1 \quad \text{s.t.} \quad A + E = X,$$

where the nuclear norm $\|A\|_*$ is equal to a sum of singular values $$\|A\|_* = \sum_{i=1}^{\min\{m,n\}} \|s_i\|_1,$$

where $\lambda$ is a weighting coefficient, and $s_i$ are the singular values, which are simply the absolute values of eigenvalues in case A is a normal matrix $A^*A = AA^*$, where $A^*$ is a conjugate transpose of A.

However, at each iteration, RPCA needs to perform a Singular Value Decomposition (SVD) and do shrinkage in the principal subspace, which is computationally demanding with a complexity $$O(\min(m^2 n, mn^2)).$$

Instead of the SVD, a partial RPCA only determines some major singular values. However, the partial RPCA requires prediction of the dimension of the principal singular space. To reduce the computational burden of the SVD, random projection based RPCA (RP-RPCA) enforces the rank minimization on a randomly projected matrix $A' = PA$, instead of on the larger matrix A.

Unfortunately, due to the large null space of the projection matrix P, RP-RPCA requires that the SVD is applied to different projected matrices A' at each iteration, and the resulting overall computational burden is higher instead. In addition, the low-rank recovery of the matrix A is not guaranteed.

Matrix Factorization

To accelerate the low-rank recovery, matrix factorization (MF) can be used. MF includes Robust Matrix Factorization (RMF), Robust Dictionary Learning (RDL), and Low-rank Matrix Fitting (LMaFit).

MF relaxes the rank minimization by representing the matrix A as $A = D\alpha$ under some compact subspace spanned by $D \in \Re^{m \times k}$, with coefficients $\alpha \in \Re^{k \times n}$ and $r \leq k \leq \min(m,n)$.

The matrix A is recovered by iterating between solving the coefficients $\alpha$, and updating the dictionary D. Because the complex SVD is avoided, the MF methods are superior to RPCA in terms of computational efficiency.

However, MF methods suffer from potential drawbacks:
(1) the non-convex model can lead to local minima;
(2) an initial rank estimate is required, which is not easily obtained especially in the case that the low-rank matrix is corrupted by outliers with a dominant magnitude; and
(3) the quadratic complexity is still high for large-scale low-rank matrix recovery.

Group sparsity is a common regularizer in sparse coding and compressive sensing (CS).

SUMMARY OF THE INVENTION

The embodiments of the invention provide a method for efficiently recovering low-rank matrices and subspaces from data in the form of high-dimensional m×n matrices, wherein the data can be corrupted, and the low-rank matrix is not.

For the purpose of this description, the method is called Structured Robust Subspace Learning (SRSL). In contrast with the prior art, the SRSL method does not require an initial estimate of the rank r of the low-rank matrix. The SRSL method is motivated by matrix factorization (MF), and sparse coding.

Specifically, the SRSL method provides a novel, SVD-free formulation for non-convex rank minimization, which is equivalent to a nuclear norm minimization (NNM) in a performance-guaranteed RPCA, yet achieves a faster robust low-rank recovery with complexity O(min) compared to the complexity $O(\min(m^2 n, mm^2))$ of the prior art RPCA. The method recovers the most compact subspace without rank estimation.

A novel random subsampling process further acceleration the method so that the computational complexity of the SRSL is a linear function of the size of the matrix size, i.e., a complexity $O(r^2 m + n))$, which makes our SRSL method superior to all prior art approaches. The low-rank minimization is performed by a shrinkage operation in a structured subspace.

A novel inexact alternative direction method and stepwise coordinate descent process achieves convergence with a high-probability because it is a non-convex problem.

DETAILED DESCRIPTION OF THE PREFERRED EMBODIMENTS

Method Overview

Figure 1:
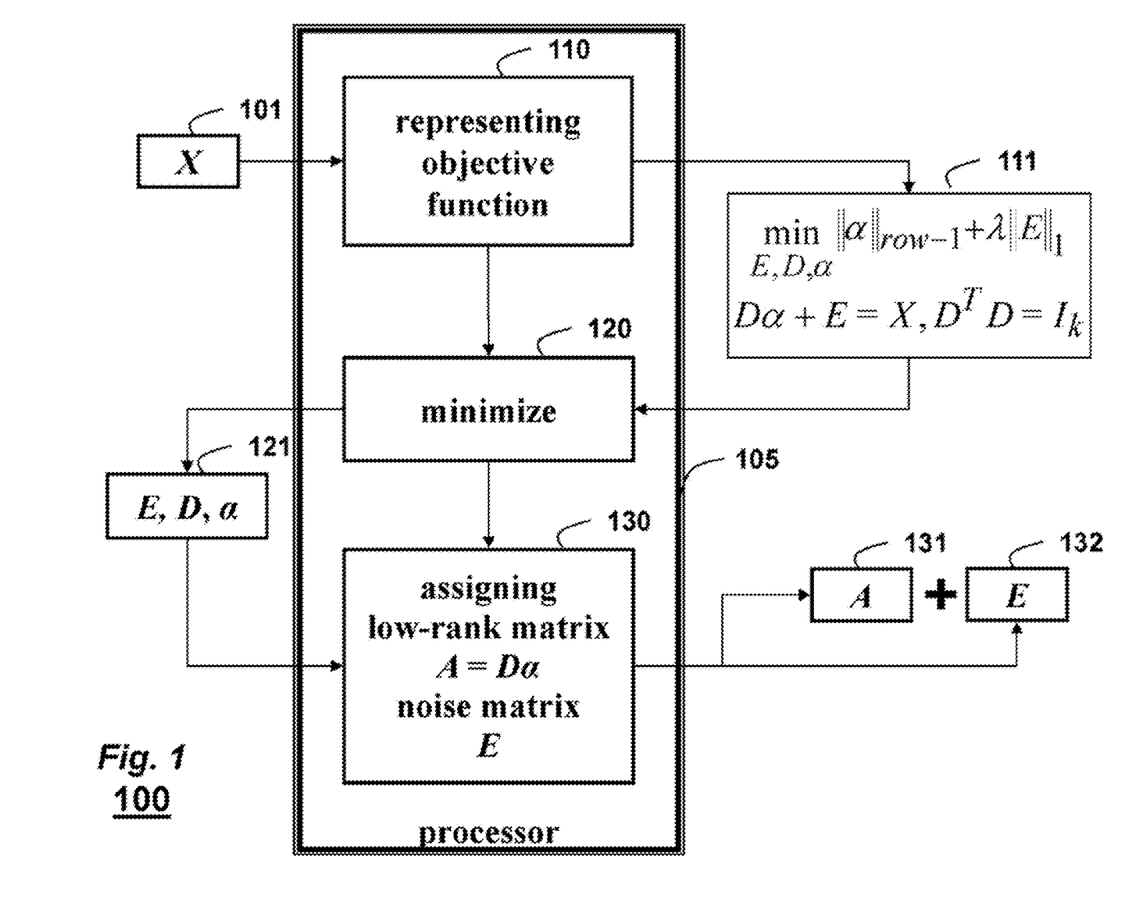
FIG. 1 is a flow diagram of a method for recovering a low-rank matrix from a high-dimensional matrix according to embodiments of the invention.

As shown in FIG. 1, the embodiments of our invention provide a method 100 for efficiently recovering a low-rank matrix A 102 and a noise matrix E 103 from data in a form of a high-dimensional matrix X 101. We call our method Structured Robust Subspace Learning (SRSL).

The high-dimensional matrix is $X \in \Re^{m \times n}$, and the data can be corrupted. A rank r of the matrix A is substantially less than min $\{m, n\}$. The matrix A can contain uncorrupted data. The sparse outlier matrix E represents noise.

An objective function 111 is represented 110 as $$\min_{E,D,\alpha} \|\alpha\|_{row-1} + \lambda \|E\|_1,$$

such that $$D\alpha + E = X, D^T D = I_k.$$

The objective function is minimized 120 to solve for E, D, $\alpha$ 121.

Figure 2:
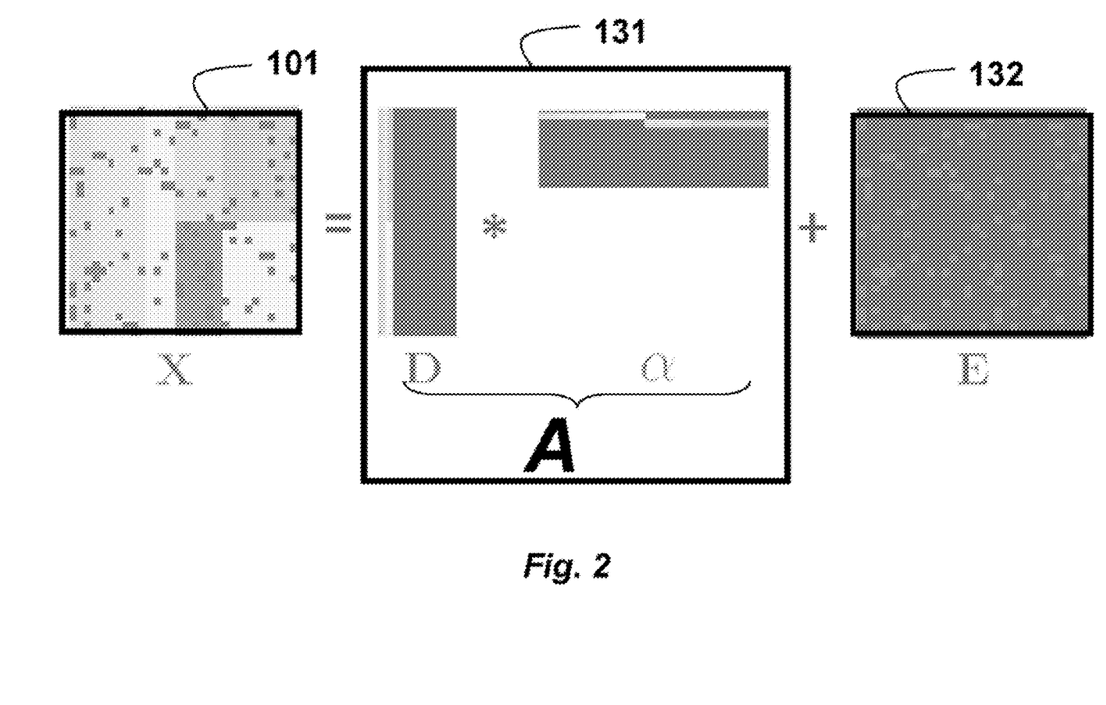
FIG. 2 is a schematic of the method of FIG. 1.

Then, the low-rank matrix A 131 is assigned 130 as A=D$\alpha$, and the noise matrix 132 is E. Thus, X=A+E, as shown in FIG. 2

The structured ordinary subspace D spanned by $$D=[D_1, D_2, \ldots, D_k] \in \Re^{m \times k},$$

$\alpha$ are coefficients $\alpha=[\alpha_1; \alpha_2; \ldots; \alpha_k] \in \Re^{k \times N}$, and $\alpha_i$ specifies a contribution of $D_i$ to each column of the matrix A. The rank k of the subspace D is assumed to be larger than the rank r of the matrix A.

A sparsity inducing row-1 norm is $\|\alpha\|_{row-1} = \Sigma_{i=1}^{k} \|\alpha_i\|_2$. A $l_1$ norm is $\|E\|_1 = \Sigma_{i=1}^{m} \Sigma_{j=1}^{n} |E_{ij}|$. A transpose operator is T. A k×k identity matrix is I, and a weighting coefficient is $\lambda$.

The method steps and processes described herein can be performed in a processor 105 connected to a memory and input/output interfaces as known in the art.

The steps are now described in greater detail.

The prior art RCA uses a principal subspace to decompose the low-rank matrix A as $A=U \Sigma V^T$ in the principal subspace. We do not.

Instead, we use the following alternative interpretation of the nuclear norm.

Lemma 1

A regularizer is $$\|A\|_* = \min_{A=D\alpha} \frac{1}{2}(\|D\|_F^2 + \|\alpha\|_F^2),$$

where is $\| \|_F$ is a Frobenius norm.

This lemma can be proven by a rank minimization heuristic applied to a minimum order system approximation.

To achieve the SVD-free low-rank recovery, our SRSL method uses a novel formulation for the rank minimization. Although the Frobenius-noon regularization is a good substitute for the nuclear norm, as Lemma 1 states, the regularization cannot automatically recover the compact subspace without rank estimation.

To determine the most compact subspace for the matrix X, our SRSL method uses group sparsity. Determining the most compact subspace also improves the computational efficiency of our SRSL.

Specifically, we replace the regularizes $\|A\|_*$ in the RPCA by row-wise sparsity of coefficients, or alternatively the column-wise sparsity of the subspace bases in the subspace D. In other words, we significantly modify the RPCA objective by sparsifying the rows of the coefficients.

Under the unit subspace constraints $D_i^T D_i=1$, $\forall i$, the SRSL method minimizes the non-zero rows of $\alpha$ by $\|\alpha\|_{row-0}$, and the sparsity of the noise matrix E by $\|E\|_0$ as follows:

$$\min_{E,D,\alpha} \|\alpha\|_{row-0} + \lambda \|E\|_1,$$

such that $$D\alpha+E=X, D_i^T D_i=1, \forall i,$$

where we set a normalization constraint $D_i^T D_i=1$, $\forall i$, under the unit subspace to avoid vanishing bases.

The $l_1$-norm is an acceptable replacement for the non-convex convex $l_0$-norm, and the $l_1/l_2$-norm is commonly used for the row sparsity.

Similarly, the row−1 norm, which is defined as $$\|\alpha\|_{row-1} = \sum_{i=1}^{k} \|\alpha\|_2,$$

is a good heuristic for the row sparsity.

Thus, our SRSL can be reformulated as $$\min_{E,D,\alpha} \|\alpha\|_{row-1} + \lambda \|E\|_1,$$

such that $$D\alpha+E=X, D_i^T D_i=1, \cdot i.$$

Group Sparsity

The SRSL method can accelerate the low-rank recovery by determining the group sparsity under the ordinary subspace, as in the above equation. However, SRSL does not guarantee that the group sparsity $\|\alpha\|_{row-0}$ is exactly equal to rank (A), because the learned bases $D=[D_1, D_2, \ldots, D_k]$ might be correlated. This might lead to some local minimum when shrinking the rows of $\alpha$.

To enable the group sparsity to be a real formulation for the rank, we constrain our subspace to be orthogonal. Thus, the SRSL recovers a low-rank matrix A by determining its row-wise sparse coefficients $\alpha$ under the orthonormal subspace D as $$\min_{E,D,\alpha} \|\alpha\|_{row-1} + \lambda\|E\|_1,$$

such that $$D\alpha+E=X, D^TD=I_k,$$

where $I_k$ is the k×k identity matrix.

Our orthogonal subspace combines the performance guaranteed RPCA and the ordinary MF. SRSL replaces the complex SVD in the RPCA with a simple orthonormal subspace learning. In one sense, the SVD is a special case of our orthonormal subspace learning $A=D\alpha$, which requires the rows of coefficients $\alpha$ to be orthogonal. Determining the row-wise sparse coefficients $\alpha$ under the orthonormal subspace is a good formulation for the nuclear norm minimization in the RPCA.

This enables us to determine the most compact subspace without an accurate estimate of the rank as in Robust Dictionary Learning (RDL), and Low-rank Matrix Fitting (LMaFit).

SRSL+: Acceleration by Random Submatrices

A faster version, SRSL+, uses a random subsampling technique. The idea is to recover the subspace bases D and the coefficients $\alpha$ from a much smaller matrix, randomly sampled from the matrix X.

Figure 3:
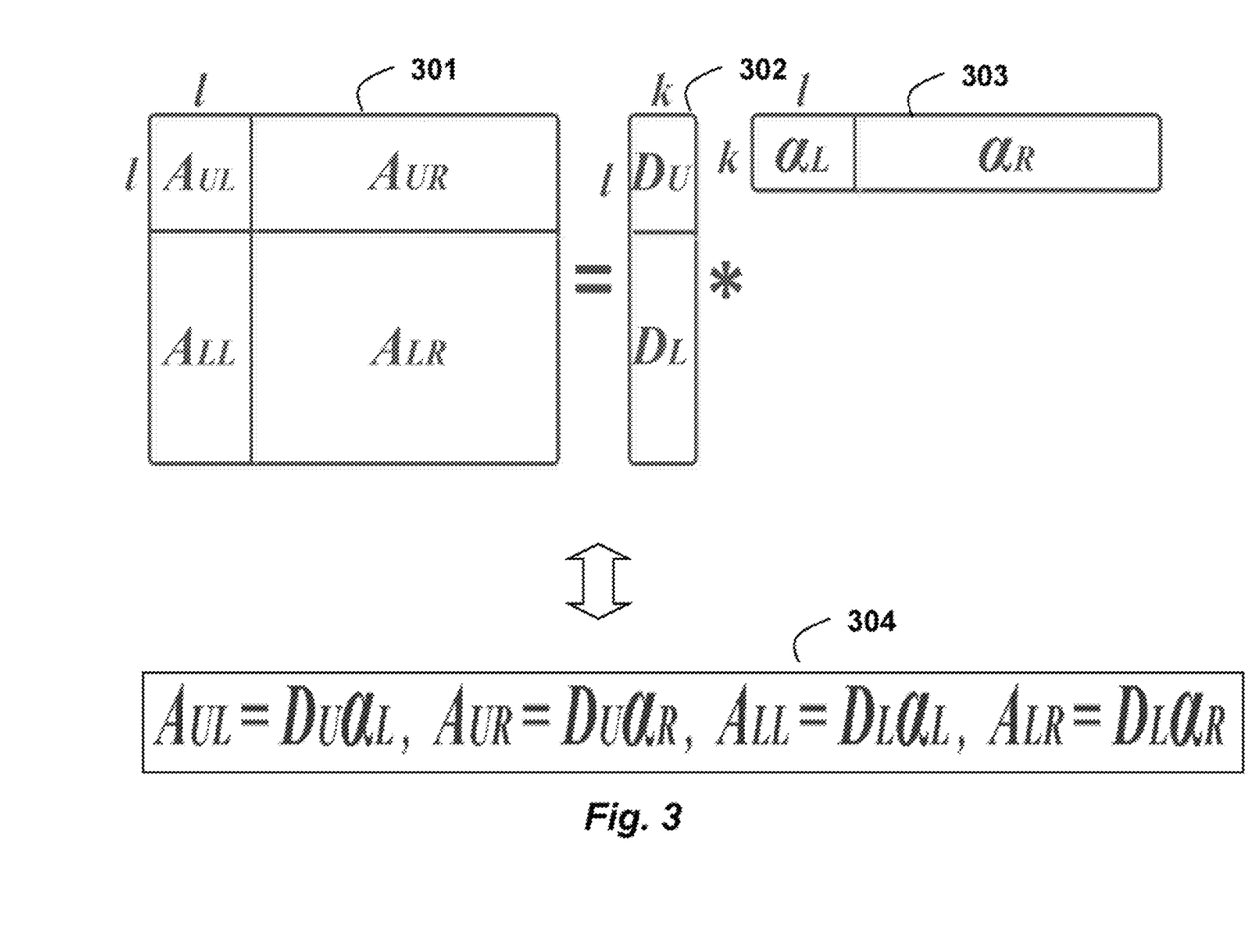
FIG. 3 is a schematic of an accelerated method that uses a random subsampling technique according to embodiments of the invention.

As shown in FIG. 3, the low-rank matrix A 301, its bases D 302, and coefficients $\alpha$ 303 are decomposed as $A=[A_U; A_L]=[A_{UL}, A_{UR}; A_{LL}, A_{LR}]$, $D=[D_U; D_L]$ and $\alpha=[\alpha_L, \alpha_R]$ 304, where $A_{UL} \in \mathfrak{R}^{l \times l}$, $D_U \in \mathfrak{R}^{l \times k}$, $\alpha_L \in \mathfrak{R}^{k \times l}$ and $l=\beta_2 r$, and $\beta_2$ is a constant greater than 1.

The matrices X and E can be decomposed, similar to A. If the rank of $A_{UL}$ is equal to that of the tank of A, i.e., $rank(D_U)=rank(R_L)=r$, then the bases $D_L$ and coefficients $\alpha_R$ can be represented as $D_L=\phi D_U$ and $\alpha_R=\alpha_L \psi$, where $\phi \in \mathfrak{R}^{(m-l) \times l}$ and $\psi \in \mathfrak{R}^{l \times (n-l)}$. In this case given $D_U \alpha = A_U$, the constraint $D_L \alpha = \phi D_U \alpha = A_L$ is redundant. Thus, $D_U$ and $\alpha$ can be recovered from a much smaller matrix without using all of the data in the much larger matrix $X_L$. After $\alpha=[\alpha_L, \alpha_R]$ is known, $D_L$ can be solved by minimizing the $l_1$-norm of $(X_{LL} - D_L \alpha_L)$. The SRSL+ can learn D and $\alpha$ using the two steps:

Simplified SRSL Problem

Solve the simplified SRSL problem as $$\min_{D_U, \alpha, E_U} \|\alpha\|row-1 + \lambda\|E_{LL}\|_1,$$

such that $$X_U=D_U\alpha+E_U,$$

$$D_U^T D_U=I_k$$

Solve the $l_1$-norm linear regression problem $$\min_{D_L, E_{LL}} \|E_{LL}\|_1,$$

such that $$X_{LL}=D_L\alpha_L+E_{LL}.$$

By learning D and $\alpha$ from small submatrices $X_U$ and $X_{LL}$, the SRSL achieves remarkable computational efficiency. However, this high efficiency is based on the assumption that rank $(A_{UL})$=rank$(A)$.

To satisfy this assumption, random subsampling is applied to the matrix X before applying the SRSL+, i.e., randomly selecting l rows and l columns of the matrix X as its upper-left submatrix $X_{UL}$. To be generic, $X_{UL}$ can be a non-square matrix.

Efficient SRSL Solver

We describe a procedure to perform the minimization in the SRSL method. This procedure can also be extended to the accelerated version SRSL+.

Efficient SRSL Solver—Alternating Direction Method

For convergence efficiency, we apply an augmented Lagrange multiplier (ALM). The Lagrange function L is $$L(A, E, Y, \mu) = \sum_{i=1}^{k} \|\alpha_i\|_2 + \lambda\|E\|_1 + \frac{\mu}{2}\|X - A - E + Y\|_F^2,$$

such that $$A=D\alpha, D^TD=I_k,$$

where $\mu$ is an over-regularization parameter, and Y is the Lagrange multiplier.

We solve this Lagrange function by an alternating direction method (ADM), which iterates through the following steps:
1. Solve $E^{i+1} \leftarrow \text{argmin } L(A^i, E, Y^i, \mu^i)$
2. Solve $A^{i+1} \leftarrow \text{argmin } L(A, E^{i+1}, Y^i, \mu^i)$.
3. Update $(Y^{i+1}, \mu^{i+1})$ with $(A^{i+1}, E^{i+1}, Y^i, \mu^i)$.

In the first step, the sparse error $E^{i+1}$ is updated by $$E^{i+1}=S_{\lambda/\mu}(X-D^i\alpha^i+y^i)),$$

where a soft shrinkage function is $S_a(X)=\max\{abs(X)-a, 0\} \cdot sign(X)$, and "·" denotes element-wise multiplication.

In the second step, solving D and $\alpha$ simultaneously is a non-convex problem. The sub-problem, i.e., updating one matrix when fixing the other matrix, is convex. This suggests an alternating minimization.

In the third step, the over-regulatization parameter $\mu$ is increased with $\mu^{i+1}=\rho\mu^i$ where the scalar $\rho>1$, and the Lagrange multiplier is updated as $Y^{i+1}=Y^i+\mu(X-D^{i+1}\alpha^{i+1}-E^{i+1})$. These iterations are done until the sparse error becomes converged, i.e., the difference of the error between successive iterations $\|E^{i+1}-E^i\|$ is smaller than the predetermined threshold.

Efficient SRSL Solver

It is possible to use an alternating minimizing scheme, i.e., a nonlinear Gauss-Seidal to update D and $\alpha$, as used by LMaFit. By fixing $E^{i+1}, \alpha^{i+1}$, we take the derivative of $L$ (D), and obtain $$(X+Y^i-E^{i+1}-D\alpha^i)\alpha^{i^T}=0, \text{ leading to}$$

$$D^{i+1}=(X+Y^i-E^{i+1})\alpha^{i^T}(\alpha^i\alpha^{i^T})^\dagger,$$

where, $B^\dagger$ denotes a Moore-Penrose pseudo-inverse matrix of the matrix B.

By omitting the group-sparsity constraint on $\alpha$, we can update $\alpha^{i+1}$ similarly as $$\alpha^{i+1} = (D^{i^T} D^i)^\dagger D^{i^T}(X + Y^i - E^{i+1}).$$

However, we need to determine the most compact subspace by enforcing the group sparsity on $\alpha$. Therefore, the nonlinear Gauss-Seidal might not be applicable to our SRSL. In addition, the nonlinear Gauss-Seidal is not efficient to update the bases D or coefficients $\alpha$ in one step.

Stepwise Coordinate Descent

Here, we describe a novel alternating stepwise coordinate descent (SCD) minimizing method.

Figure 6:
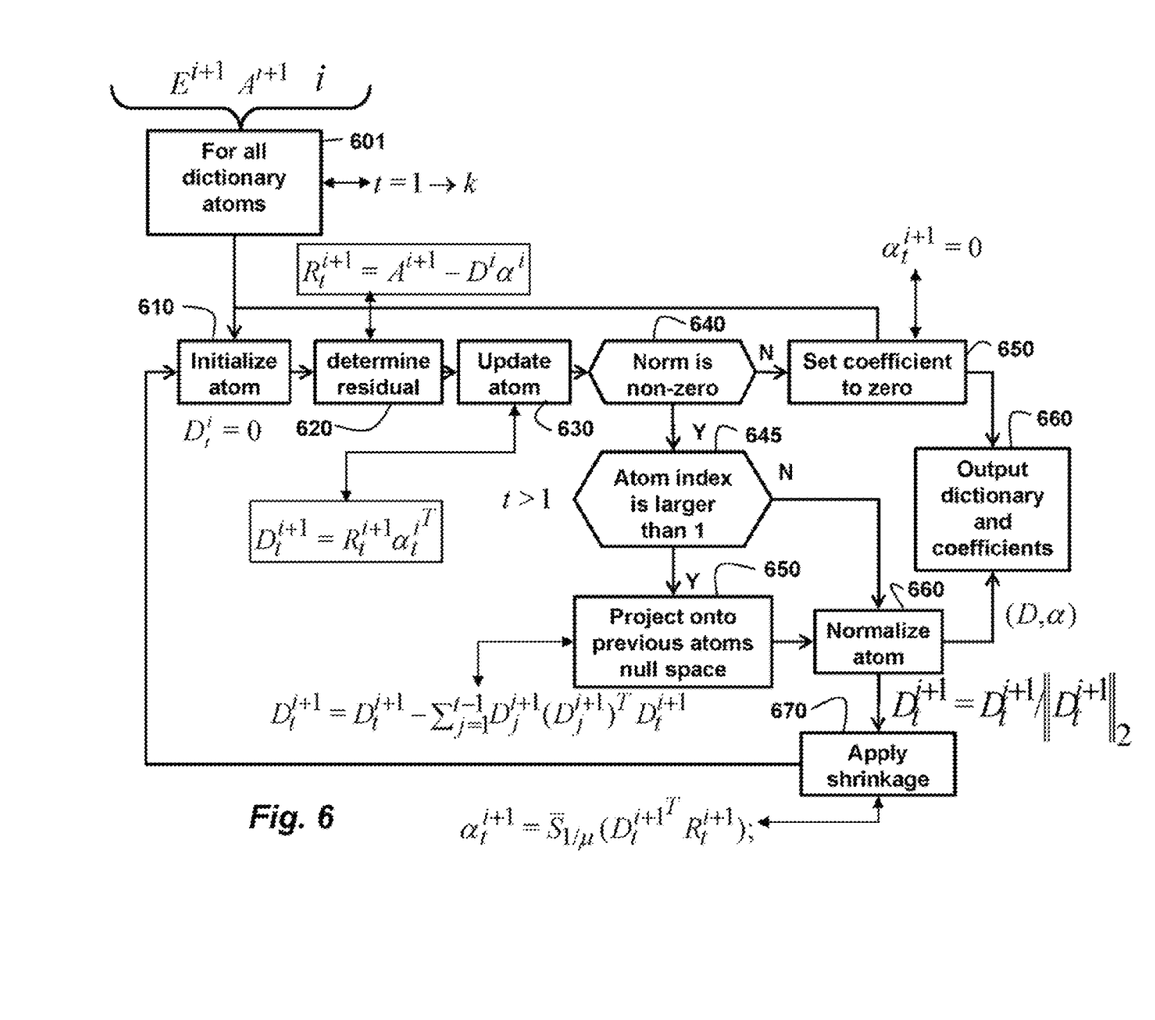
FIG. 6 is a flow diagram of a stepwise coordinate descent minimizing method according to embodiments of the invention.

FIG. 6 is a flow diagram of a stepwise coordinate descent minimizing method according to embodiments of the invention. Only essential steps are shown.

In step 601, the atoms are initialized. The subspace D is also initialized 610. The residual is determined 620, and the atom is updated 630.

Otherwise, if 645 the atom index is larger than 1 project 650 the atom onto previous atoms in the null space, and normalize 660 the atoms before proceeding with step 660.

This procedure uses a dictionary of atoms. For the subspace bases $D=[D_1, \ldots, D_t, \ldots, D_k]$ and coefficients $\alpha=[\alpha_1; \ldots; \alpha_t; \ldots; \alpha_k]$, the SCD sequentially updates each column of the bases D and its corresponding row of the coefficients $\alpha$. In this way, the method obtains new subspace bases and coefficients that best fit the objective $A=D\alpha$. In addition, the method can shrink the group sparsity, while updating $(D_r,\alpha_r)$ step wise. Instead of using SVD, it updates $(D_r,\alpha_r)$ by using the simple matrix multiplication.

SCD initializes all dictionary atoms 601 one by one $D_t^i=0$ as in step 610. Therefore, the subspace D is also initialized 610. Then, SCD determines a residual 620 $R_t^{i+1}=A^{i+1}-D^i\alpha^i$ and the dictionary atom $D_t^{i+1}=R_t^{i+1}\alpha_t^{i^T}$ is updated 630. If the norm of the dictionary atom is non-zero $\|D_t^{i+1}\|_2>0$ 640 and the atom index is larger than 1 t>1 645, the atom is projected onto previous atoms in the null space $D_t^{i+1}=D_t^{i+1}-\Sigma_{j=1}^{t-1}D_j^{i+1}(D_j^{i+1})^T D_t^{i+1}$ 650, and normalized $D_t^{i+1}=D_t^{i+1}/\|D_t^{i+1}\|_2$ 660 the atoms before proceeding with step 660. A shrinkage operation is applied $\alpha_t^{i+1}=\overline{S}_{1/\mu}(D_t^{i+1^T}R_t^{i+1})$; 670.

If 640 the norm is zero, the coefficients are set 650 to zero $\alpha_t^{i+1}=0$, and the dictionary and coefficients are output 660.

Without considering the group sparsity on $\alpha$ and the orthonormal constraint on D the SCD iteratively updates $(D_r, \alpha_r)$ by pair as follows:

$$D_r^{i+1} = \left(X + Y^i - E^{i+1} - \sum_{j \neq r} D_j^i \alpha_j^i\right)\alpha_r^{i^T},$$

and $$\alpha_r^{i+1} = D_r^{i+1^T}\left(X + Y^i - E^{i+1} - \sum_{j \neq r} D_j^{i+1}\alpha_j^i\right).$$

There are several reasons for applying our SCD.

First, the SCD can avoid the matrix inverse operation in the above Eqns., which is computationally complex, especially when the subspace dimension is large.

Second, by sequentially updating $(D_r,\alpha_r)$, the SCD accelerates convergence, because new subspace bases and coefficients that best fit the objective $A=D\alpha$ are obtained as in K-SVD.

Third, most importantly, the SVD shrinks the subspace dimension when updating the basis-coefficient pairs $(D_r,\alpha_r)$, which largely reduces the computational complexity of our SRSL.

When taking into account the group sparsity on the coefficients $\alpha$, we reformulate the iterative SCD update for on $\alpha$. By leaving all rows of $\alpha$ intact except $\alpha_r$ and omitting other fixed variables, we obtain an objective function:

$$Q(\alpha_r) = \lambda\|\alpha_r\|_2 + \frac{\mu}{2}\left\|A - \sum_{j \neq r} D_j\alpha_j - D_r\alpha_r\right\|_F^2,$$

where $$A = X - E + Y.$$

If a residual is $R_r=A-\Sigma_{j \neq r}D_j\alpha_j$, then we induce the optimal condition by setting the derivative of $Q(\alpha_r)$ to be zero $$\frac{\partial}{\partial \alpha_r}Q(\alpha_r) = \lambda\frac{\alpha_r}{\|\alpha_r\|_2} + \mu(\|D_r\|_2^2\alpha_r - D_r^T R_r),$$

and $$\alpha_r = \left(\|D_r\|_2^2 + \frac{\lambda}{\mu\|\alpha_r\|_2}\right)^{-1}D_r^T R_r.$$

Thus, $\alpha_r$ is a scale version of $D_r^T R_r$, denoted as $\alpha_r=bD_r^T R_r$, where b is a non-negative constant.

It is easy to induce the value of b, i.e., $$b = 1 - \frac{\lambda}{\mu\|D_r^T R_r\|_2}$$

We define a magnitude shrinkage function as $$\overline{S}_a(X) = \max\{\|X\|_2 - a, 0\}\frac{X}{\|X\|_2}.$$

We can obtain the update scheme on $\alpha$ as follows:

$$\alpha_r = \frac{1}{\|D_r\|_2^2}\overline{S}_{\lambda/\mu}(D_r^T R_r).$$

Essentially, the SCD sequentially fits a rank−1 subspace to the objective $X-Y^i-E^{i+1}=D\alpha$, until the fitted subspace is trivial, which means that the magnitude of coefficients are too small.

By initializing $A^0=X$, $D^0=$zeros(m,K), and $\alpha^0=$rand(K,n), our SRSL can be solved using inexact ADM and SGS.

Figure 4A:
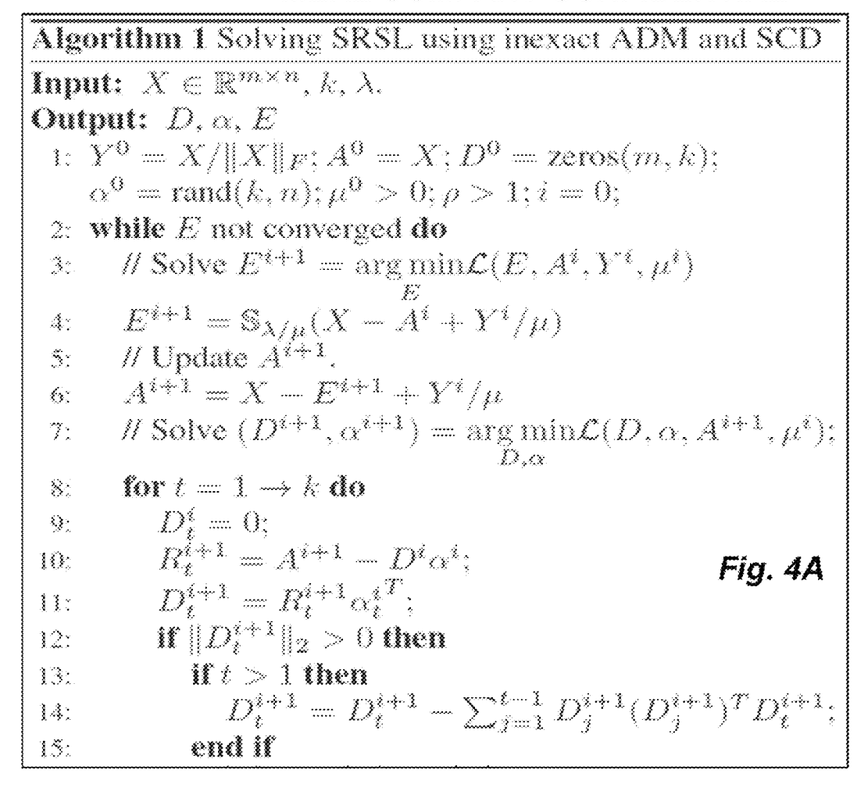
FIG. 4 is shows pseudo code for solving the method with an alternating direction method and a stepwise coordinate descent according to embodiments of the invention.
Figure 4B:
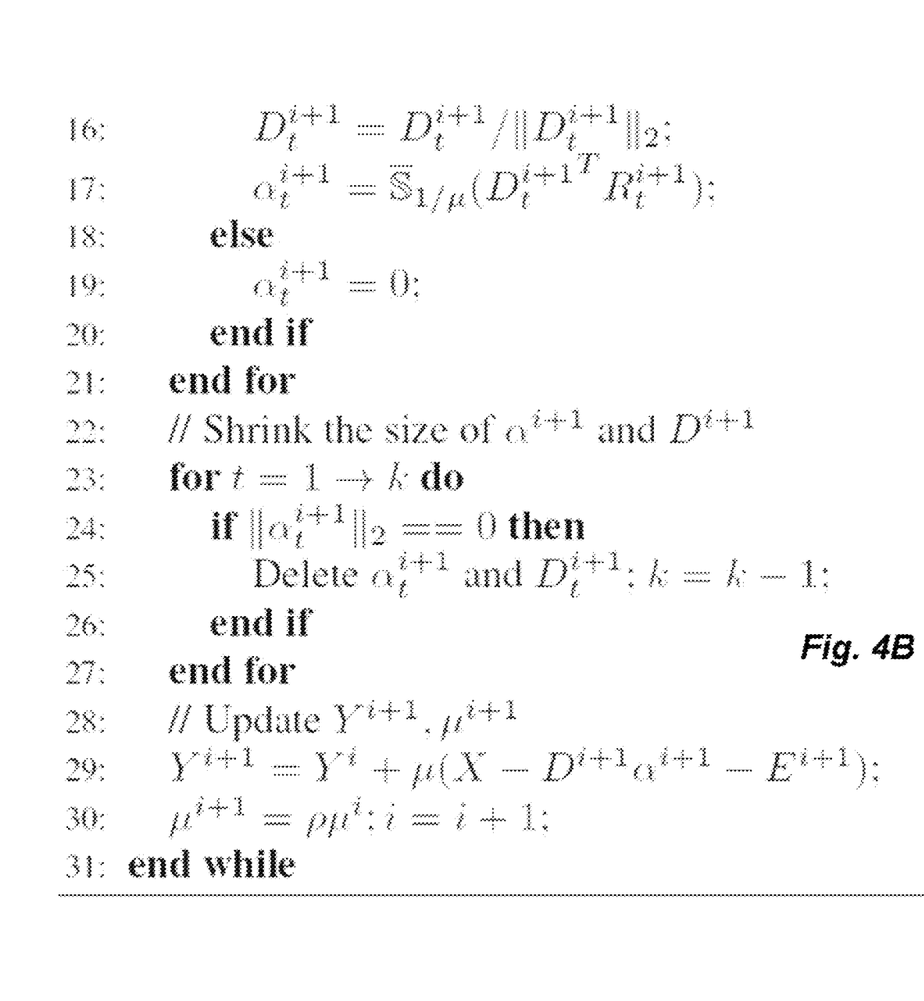

FIG. 4 shows the pseudo codes, which can easily be understood by those skilled in the art, given the variables as described here. For clarity, reference numerals are omitted, and only line numbers are indicated.

Compared to RPCA using SVD, our SRSL improves the computational efficiency by using a single iteration of alternating optimization. This acceleration method is very much in line with the leap from K-SVD to approximated K-SVD.

Computational Complexity

The computational complexity of the original RPCA mainly depends on the SVD of $A \in \mathfrak{R}^{m \times n}$, which is known to have the cubic complexity $O(\min(m^2n, mn^2))$. Compared with the original RPCA, SRSL is much more efficient, for its dominant computational processes are left multiplying the residual matrix $R \in \Re^{m \times n}$ by D, and right multiplying the residual by $\alpha$. Because the dimension k of D quickly converges to the rank r, where $r \leq k \gg \min(m,n)$, the computational complexity of our SRSL method is $O(mnr)$, which can be regarded as a quadratic function of the matrix size.

Instead of recovering D and $\alpha$ from the larger full matrix $X \in \Re^{m \times n}$, SRSL+ first recovers $D_U$ and $\alpha$ from the smaller subsampled submatrix $X_U$ at a complexity: $O(\ln k)$, and then determines $D_L$ by minimizing the $l_1$-norm of $X_{LL} - D_L \alpha_L$ with a complexity: $O(mlk)$. Thus, SRSL+ has the complexity of $O(lk(m+n))$. Because $k = \beta_1 r$ and $l = \beta_2 r$, where $\beta_1 > 1$ and $\beta_2 > 1$ are constants, the complexity of SRSL+ is $O(r^2(m+n))$, which is a linear function of the size of the high-dimensional matrix matrix.

Bounds of Group Sparsity

The SRSL and SRSL+ methods provide the possibility of breaking the curse of the large-scale SVD in the prior art RPCA optimization. This acceleration is brought about by relaxing the requirements on D from principle components to orthonormal bases. This relaxation allows us to determine the low-rank decomposition using efficient sparse coding approaches, similar to K-SVD.

We provide proof that our group sparsity minimization is a good formulation for the matrix rank and nuclear norm.

Bounds of Group Sparsity

Proof

Without a loss of generality, the low-rank matrix is $A \in \Re^{m \times n}$ ($m \geq n$). The SVD and orthonormal subspace decomposition are respectively denoted as $A = USV$ and $A = D\alpha$, where $D \in \Re^{m \times n}$, $\alpha \in \Re^{n \times n}$ and $D^T D = I_n$. The row group sparsity on $\alpha$ and its heuristic using row-1 norm are respectively bounded by the rank of A and the nuclear norm $\|A\|_*$ as follows:

$$\underset{D\alpha = A, D^T D = I_n}{\operatorname{argmax}} \; \|\alpha\| \operatorname{row} - 0 = \operatorname{rank}(A), \qquad (P1)$$

and $$\underset{D\alpha = A, D^T D = I_n}{\min} \; \|\alpha\| \operatorname{row} - 1 = \|A\|_*. \qquad (P2)$$

Proof of (P1)

It is straightforward that the rank of $A = D\alpha$ is smaller than the dimension of $\alpha$, resulting in that $\|\alpha\| \operatorname{row} - 0 \geq \operatorname{rank}(A)$. Thus, minimizing the row-0 norm of coefficients $\alpha$ under orthogonal subspace D is equivalent to the non-convex rank minimization of A.

Proof of (P2)

(P2) can be clarified as $\|\alpha\| \operatorname{row} - 1 = \Sigma_{i=1}^n \|\alpha_i\|_2$, which reaches its minima $\|A\|_*$ when the orthonormal bases are equal to the principle components, i.e., $D = U$. For simplicity of proof, we ignore other trivial minimizers, e.g., the variations of D by columnwise permutation, or changing the signs of its column vectors. Because both D and U are orthonormal bases, we obtain a relationship, $D = U\Omega$ and $\alpha = \Omega SV^T$, where $\Omega$ is a rotation matrix ($\Omega^T \Omega = I_n$, $\det(\Omega) = 1$).

To validate (P2), we prove that the following relation holds for any $\Omega$, and the equality holds when $\Omega$ is the identity matrix $$\|\alpha\| \operatorname{row} - 1 = \|\Omega S V^T\| \operatorname{row} - 1 \geq \sum_{i=1}^n S_i.$$

1. We begin with the case that all the singular values are identical, i.e., $S_i = \sigma_n$, $1 \leq i \leq n$. Because each row of the rotation matrix $\Omega$ is a unit vector, the row-1 sparsity can be determined as $$\|\alpha\| \operatorname{row} - 1 = \sum_{j=1}^n \sqrt{\sum_{i=1}^n \Omega_{ji}^2 S_i^2} = \sum_{i=1}^n S_i.$$

2. Then, we increase the top $n-1$ singular values from $\sigma_n$ to $\sigma_{n-1}$, i.e., $S_i = \sigma_{n-1}$, $1 \leq i \leq n-1$. The partial derivative of $\|\alpha\|$ row-1 with respect to $S_i$, $1 \leq i \leq n-1$ is $$\frac{\partial \|\alpha\| \operatorname{row} - 1}{\partial S_i} = \sum_{j=1}^n \frac{\Omega_{ji}^2}{\sqrt{\sum_{t=1}^{n-1} \Omega_{jt}^2 + \Omega_{jn}^2 (S_n^2 / S_i^2)}}.$$

Because $S_n \leq S_i$, $1 \leq i \leq n-1$ and $\Sigma_{t=1}^n \Omega_{jt}^2 = 1$, we reach the following relationship:

$$\frac{\partial \|\alpha\| \operatorname{row} - 1}{\partial S_i} \geq \sum_{j=1}^n \Omega_{ji}^2 = 1 = \frac{\partial \|A\|_*}{\partial S_i}.$$

Thus, $\|\alpha\|$ row-1 $\geq \|A\|_*$, when increasing $S_i$, $1 \leq i \leq n-1$ from $\sigma_n$ to $\sigma_{n-1}$. In the same way, we can prove that $\|\alpha\|$ row-1 - $\|A\|_*$ continues increasing when we repeatedly increasing the top i singular values from $\sigma_{i+1}$ to $\sigma_i$, $i \in \{n-2, n-3, \ldots, 1\}$.

3. In other words, $\|\alpha\|$ row-1 $\geq \|A\|_*$ when the singular values $S_i$, $1 \leq i \leq n-1$, are not identical.

Thus, (P2) holds $\|\alpha\|$ row-1 = $\|A\|_*$ when $D = U$.

The above proof establishes that our SRSL is equivalent to the performance-guaranteed RPCA. However, we recover the corrupted low-rank matrix A by solving the SRSL without estimating the rank.

Convergence Analysis

Solve the SRSL is a non-convex optimization, similar to other matrix factorization problems. However, our orthogonal subspace learning, using the SCD scheme, can prevent the SRSL from reaching a local minima with high probability.

First, our orthogonal subspace learning guarantees that $\|\alpha_i\|_2$ is a good indicator of the importance of its corresponding base $D_i$. This prevents the case that the major component ($D_i \alpha_i$) is decomposed into many small correlated components and canceled by the magnitude shrinkage.

Second, our orthonormal subspace learning using the SCD can obtain the bases $D = [D_1, D_2, \ldots, D_k]$ in the order of decreasing importance i.e., $\|\alpha_i\|_2 > \|\alpha_j\|_2 \forall i < j$), which is similar to sequentially solving the SVD.

The final $D_t$ is the projection of $D_t = R_t \alpha_t^T$ onto the null space of $[D_1, \ldots, D_{t-1}]$, and thus the part of $R_t$ that lies in the range space of $[D_1, \ldots, D_{t-1}]$ will help increase $[\alpha_1, \ldots \alpha_{t-1}]$ in the next iteration.

In sum, the empirical evidence shows that SRSL has very strong convergence behavior.

Given rank($A_{LL}$)=rank(A)=r, the performance of our SRSL+ depends on solving the simplified SRSL problem described above. As l increases, rank($A_{LL}$) quickly increases to r and the low-rank recovery of SRSL+ converges to that of SRSL with high probability.

Detailed Method Steps

Figure 5:
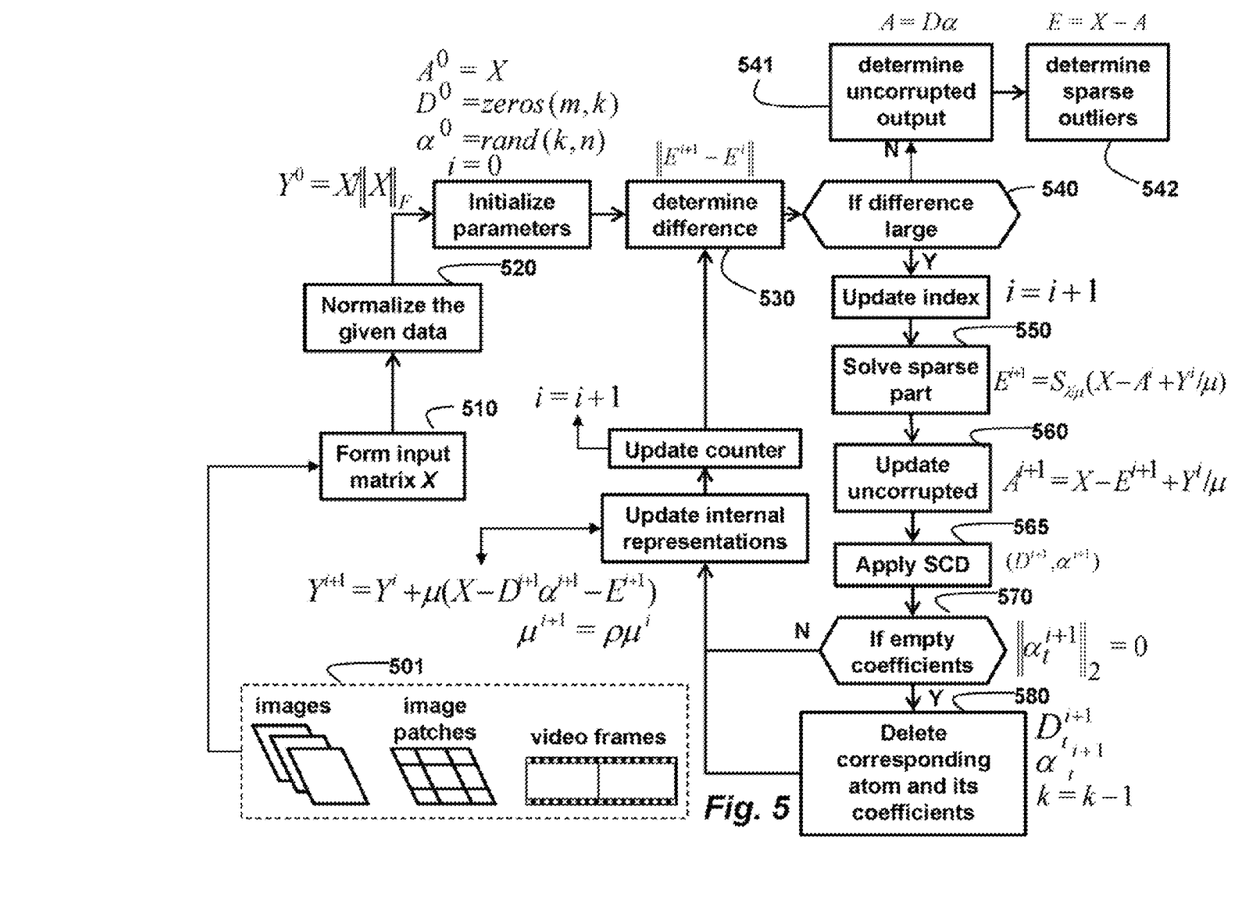
FIG. 5 is a detailed flow diagram of the method of FIG. 1.

FIG. 5 shows the details of our method. In FIG. 5, we focus on the relevant steps, and trivial steps are marginalized for clarity of the figure. The variables an equations are as described above.

The method is described for an example computer vision application. However, it is understood that the method can be used for any number of applications not limited to computer vision, statistical learning, and neural networks.

Input data 501 can be images, image patches, or video frames. Such data are known to be subject to noise and errors, and can thus be corrupted. The data are formed 510 as the high-dimensional matrix X, which can be normalized 520.

For example, the columns of X are vector formed from video frames, columns of D are determined from background models of a scene, and columns of E are determined from foreground regions in the scene including moving objects.

Or, columns of X are vector formed from spatially registered images of an object, columns of D are determined from a mutual image, and columns of E are difference regions, and the mutual image is a reflectance image and the difference regions are illumination regions for the images of the object acquired under different lighting conditions.

Or, columns of X are face images.

Or, columns of X are vector formed from observation samples, columns of D are determined from models, and columns of E are the noise.

Or, columns of X are vectors formed image patches, columns of D are determined from models, the matrix A=Dα is filtered patches, and columns of E are the noise for image enhancement and filtering.

Parameters of the method are initialized. Then, a difference between the current noise and previous noise is determined 530 as a termination condition. If 540 the difference is smaller than some predetermined threshold, then low-rank matrix 541, and the noise matrix 542 are output. The matrix A is substantially uncorrupted.

Otherwise iterate, and solve 540 the sparse part, update 560 the matrix A, and apply 565 the SCD as described above. If 570 there are empty coefficients, deleted 580 the corresponding atoms and coefficients as described below. After updating the internal representations and the iteration counter, iterate beginning at step 530.

Effect of the Invention

The embodiments of the invention provide a structured and accurate subspace learning method to achieve in Lich faster low-rank recovery of high-dimensional data than the prior art RPCA, without compromising accuracy.

Different from LMaFit and RDL, our SRSL method uses the group sparsity to recover the most compact subspace, without requiring an initial estimate of its rank.

We also provide an efficient method solves the SRSL for large-scale low-rank recovery, which is even faster than the fastest existing MF approach, LMaFit.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for recovering a low-rank matrix A, noise, and a subspace from data in a form of a high-dimensional matrix X, comprising the steps:

representing an objective function as $$\min_{E,D,\alpha} \|\alpha\|_{row-1} + \lambda \|E\|_1,$$

such that $$D\alpha + E = X, D^T D = I_k;$$

minimizing the objective function to solve for E, D, and α, wherein the high-dimensional matrix is $X \in \Re^{m \times n}$, the low-rank matrix with rank r=min{m,n} is A=Dα, the subspace D is spanned by $D=[D_1, D_2, \ldots, D_k] \in \Re^{m \times k}$, α are coefficients $\alpha=[\alpha_1; \alpha_2; \ldots; \alpha_k] \in \Re^{k \times N}$, $\alpha_i$ specifies a contribution of $D_i$ to each column of the low-rank matrix A, E is a sparse matrix representing the noise in the data, $\|\alpha\|_{row-1} = \Sigma_{i=1}^k \|\alpha_i\|_2$ is a sparsity inducing row-1 norm, $\|E\|_1 = \Sigma_{i=1}^m \Sigma_{j=1}^n |E_{ij}|$ is an $l_1$ norm, T is the transpose operator, $I_k$ is an k×k identity matrix, and λ is a weighting coefficient; and assigning the low-rank matrix as A=Dα and the noise matrix as E, wherein the steps are performed in a processor.

2. The method of claim 1, wherein the minimizing further comprises the steps of:

assigning a Lagrange function L $$L(A, E, Y, \mu) = \sum_{i=1}^k \|\alpha_i\|_2 + \lambda\|E\|_1 + \frac{\mu}{2}\|X - A - E + Y\|_F^2,$$

such that $$A = D\alpha, D^T D = I_k,$$

where μ is an over-regularization parameter, and Y is a Lagrange multiplier, and μ is an over-regularization parameter;

solving the Lagrange function $$E^{i+1} = \underset{E}{\operatorname{argmin}} L(E, A^i, Y^i, \mu^i)$$

to determine $E^{i+1}$ as $E^{i+1} = S_{\lambda/\mu}(X - A^i + Y^i/\mu)$, where a soft shrinkage function is $S_a(X) = \max\{abs(X) - a, 0\} \cdot sign(X)$, and "." denotes element-wise multiplication;

updating $A^{i+1}$ as $A^{i+1} = X - E^{i+1} + Y^i/\mu$;

solving the Lagrange function $$(D^{i+1}, \alpha^{i+1}) = \underset{D,\alpha}{\operatorname{argmin}} L(D, \alpha, A^{i+1}, \mu^i)$$

by a stepwise coordinate descent (SCD) for t=1→k until $\|E^{i+1} - E^i\|$ is smaller than a predetermined threshold;

shrinking a size of a dictionary if $\|\alpha_t^{i+1}\|_2 = 0$ by deleting corresponding atom $D_t^{i+1}$ and coefficient $\alpha_t^{i+1}$ and setting an atom counter k=k−1;

determining $(Y^{i+1}, \mu^{i+1})$ ad $Y^{i+1} = Y^i + \mu(X - D^{i+1}\alpha^{i+1} - E^{i+1})$ and $\mu^{i+1} = \rho\mu^i$ until $\|E^{i+1} - E^i\|$ is smaller than the predetermined threshold for $t = 1 \to k$;

updating the iteration counter $i = i+1$ where $\alpha^0 = \text{rand}(k, n)$, $\mu^0 > 0$, $\rho > 1$, $i = 0$, $Y^0 = X/\|X\|_F$ is a normalized high-dimensional matrix, $A^0 = X$, and $D^0 = \text{zeros}(m, k)$ at a first iteration.

3. The method of claim 2, wherein the SCD further comprises the steps of:

initializing a dictionary atoms $D_t^i = 0$;

determining a residual $R_t^{i+1} = A^{i+1} - D^i\alpha^i$;

determining $D_t^{i+1} = R_t^{i+1}\alpha_t^{i^T}$ if the norm of the dictionary atom is positive $\|D_t^{i+1}\|_2 > 0$ and $t > 1$;

determining $D_t^{i+1} = D_t^{i+1} - \sum_{j=1}^{t-1} D_j^{i+1}(D_j^{i+1})^T D_t^{i+1}$;

normalizing the dictionary atom by $D_t^{i+1} = D_t^{i+1}/\|D_t^{i+1}\|_2$ if the norm of the dictionary atom is positive $\|D_t^{i+1}\|_2 > 0$;

applying shrinkage $\alpha_t^{i+1} = \overline{S}_{1/\mu}(D_t^{i+1^T} R_t^{i+1})$; and setting the coefficient to zero $\alpha_t^{i+1} = 0$ if the norm of the dictionary atom is zero.

4. The method of claim 1, wherein the minimizing subsamples the data, and further comprising the steps of:

decomposed a dictionary matrix into $D = [D_U; D_L]$ matrices;

decomposing the low-rank matrix into $A = [A_U; A_L] = [A_{UL}, A_{UR}; A_{LL}, A_{LR}]$ matrices;

decomposing the coefficients into $\alpha = [\alpha_L, \alpha_R]$ matrices, where where $A_{UL} \in \Re^{l \times l}$, $D_U \in \Re^{l \times k}$, $\alpha_L \in \Re^{k \times l}$ and $l = \beta_2 r$, $\beta_2 > 1$ is a constant), $X = [X_U; X_L]$, and $E = [E_U; E_L]$;

determining $D_U$, $E_U$ and $\alpha$ by minimizing $X_U$ $$\min_{D_U, \alpha, E_U} \|\alpha\|\text{row} - 1 + \lambda\|E_{LL}\|_1,$$

such that $X_U = D_U\alpha + E_U$, and $D_U^T D_U = I_k$;

determining $D_L$ by minimizing a $l_1$-norm of $(X_{LL} - D_L\alpha_L)$ $l_1$-norm linear regression problem $$\min_{D_L, E_{LL}} \|E_{LL}\|_1,$$

such that $X_{LL} = D_L\alpha_L + E_{LL}$.

5. The method of claim 4, wherein the submatrix $X_U$ is a randomly sampled from the matrix X.

6. The method of claim 1, wherein columns of X are vector formed from video frames, columns of D are determined from background models of a scene, and columns of E are determined from foreground regions in the scene including moving objects.

7. The method of claim 1, wherein columns of X are vector formed from spatially registered images of an object, columns of D are determined from a mutual image, and columns of E are difference regions.

8. The method of claim 7, wherein the mutual image is a reflectance image and the difference regions are illumination regions for the images of the object acquired under different lighting conditions.

9. The method of claim 7, wherein the columns of X are face images.

10. The method of claim 1, wherein columns of X are vector formed from observation samples, columns of D are determined from models, and columns of E are the noise.

11. The method of claim 1, wherein columns of X are vectors formed image patches, columns of D are determined from models, the matrix $A = D\alpha$ is filtered patches, and columns of E are the noise for image enhancement and filtering.

12. The method of claim 1, wherein the data are corrupted, and the low-rank matrix A is uncorrupted.

13. A method for recovering a low-rank matrix A, noise, and a subspace from data in a form of a high-dimensional matrix X, comprising the steps:

decomposing the high dimensional matrix into a sum of a sparse matrix E and the low-rank matrix A;

decomposing the low-rank matrix A into a multiplication of a structured dictionary matrix D and a structured coefficient matrix $\alpha$; and determining the matrices D, E, and $\alpha$ by minimizing a sum of a row−1 norm of the structured coefficient matrix and a weighted $l_1$ norm of the sparse matrix E while imposing the constraint that the dictionary matrix columns are orthonormal, wherein the steps are performed in a processor.

* * * * *